(12) United States Patent
Kutsuna et al.

(10) Patent No.: US 7,443,116 B2
(45) Date of Patent: Oct. 28, 2008

(54) ELECTRICALLY POWERED VEHICLE MOUNTING ELECTRIC MOTOR AND CONTROL METHOD THEREFOR

(75) Inventors: Masaki Kutsuna, Toyota (JP); Koichiro Muta, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 124 days.

(21) Appl. No.: 11/598,001

(22) Filed: Nov. 13, 2006

(65) Prior Publication Data
US 2007/0114965 A1      May 24, 2007

(30) Foreign Application Priority Data
Nov. 18, 2005    (JP) ............................. 2005-334088

(51) Int. Cl.
*H02P 1/00*      (2006.01)
(52) U.S. Cl. ..................... 318/139; 318/727; 318/432; 180/65.1; 180/65.3
(58) Field of Classification Search ................. 318/139, 318/727, 432, 434, 798, 802; 180/65.1, 65.2, 180/65.3
See application file for complete search history.

(56) References Cited

U.S. PATENT DOCUMENTS 5,287,051 A * 2/1994 Konrad et al. ............... 318/803
5,362,135 A * 11/1994 Riddiford et al. ............. 303/3
5,879,062 A    3/1999 Koga et al.
5,880,574 A    3/1999 Otsuka et al.
6,429,613 B2 * 8/2002 Yanase et al. ............... 318/139

FOREIGN PATENT DOCUMENTS

JP      A 2000-134990    5/2000
WO    WO 2007/005318 A2  1/2007

* cited by examiner

*Primary Examiner*—Rina I Duda
(74) *Attorney, Agent, or Firm*—Oliff & Berridge, PLC

(57) ABSTRACT

A normal map determines a carrier frequency used for switching control of an inverter controlling driving of a motor generator, in accordance with the state of operation of the motor generator in a normal operation. In a stall state in which the driver is pressing both the accelerator pedal and the brake pedal, the switching frequency is determined using an element protection map, in place of the normal map. When the element protection map is used, in the state of operation corresponding to the stall state, the carrier frequency is set to a protection frequency lower than a normal frequency. Therefore, in an electric vehicle having an electric motor (motor generator) as a driving source for the vehicle, it becomes possible to avoid temperature increase of a power semiconductor device forming an electric power converter for controlling driving of the electric motor.

12 Claims, 6 Drawing Sheets

ELECTRICALLY POWERED VEHICLE MOUNTING ELECTRIC MOTOR AND CONTROL METHOD THEREFOR

This nonprovisional application is based on Japanese Patent Application No. 2005-334088 filed with the Japan Patent Office on Nov. 18, 2005, the entire contents of which are hereby incorporated by reference.

BACKGROUND OF THE INVENTION

1. Field of the Invention

The present invention relates to an electrically powered vehicle and a method of controlling the same. More specifically, the present invention relates to an electrically powered vehicle having a function of preventing overheat of an electric power converter used for power supply to the electric motor, as well as to a control method realizing the function.

2. Description of the Background Art

Generally, for controlling driving of an electric motor (motor generator) used as a power source for driving an electrically powered vehicle such as an electric vehicle or a hybrid vehicle, an electric power converter (represented by an inverter for AC motor drive) formed to include an on/off controlled, power semiconductor device (switching element) is used. In the electric power converter such as the inverter, power conversion is attained through high frequency and high-power switching. Such switching typically causes heat build-up in the switching element (for example, a high-power transistor such as IGBT), and therefore, control of an electric power converter requires measures to prevent overheating of the switching element.

In view of the foregoing, Japanese Patent Laying-Open No. 2000-134990 discloses a temperature protective controller preventing overheating of the electric power converter by reducing switching frequency of the switching element at the time of a motor lock, in which rotation of the motor is locked by an external force. In the controller, a determination torque command value is utilized, which value is set relatively lower as the inverter temperature increases, and when a motor torque command value becomes larger than the determination torque command value, switching frequency is set lower than in a normal situation. Accordingly, overheat of the electric power converter can be prevented, avoiding as much as possible the problems raised by decreased frequency such as motor noise.

In the configuration disclosed in Japanese Patent Laying-Open No. 2000-134990, however, the inverter frequency is not decreased until the inverter temperature, that is, the temperature of the switching element forming the inverter, has actually been increased, and therefore, this approach is insufficient from the viewpoint of protecting the switching element. By way of example, assume that the driver gives a specific instruction and it is expected that the motor would rotate at a lower speed while continuously receiving a torque output command. Even in that case, the steps for preventing overheat cannot be taken until the temperature of the switching element actually increases. Therefore, the effect of preventing overheat has been unsatisfactory.

SUMMARY OF THE INVENTION

An object of the present invention is to provide a controller for an electrically powered vehicle including an electric motor (motor generator) as a power source for driving the vehicle, which can appropriately avoid temperature increase of a power semiconductor device (switching element) forming an electric power converter controlling diving of the electric motor.

In short, the present invention is directed to an electrically powered vehicle, including an electric motor, an electric power converter, first and second detectors and a controller. The electric power converter controls driving of the electric motor by power conversion through on/off control of a power semiconductor device. The first detector detects an operation of an accelerator pedal of the vehicle. The second detector detects an operation of a brake pedal of the vehicle. The controller includes a detecting portion and a first frequency setting portion. The detecting portion is configured to detect a stall state in which the accelerator pedal and the brake pedal are both operated. The first frequency setting portion is adapted to set, when the detecting portion detects the stall state by the detecting portion, switching frequency of the power semiconductor device to a value lower than when the stall state is not detected.

Alternatively, the controller controls operations of the electric motor and the electric power converter, and particularly, it is adapted, based on the outputs from the first and second detectors, to detect the stall state in which the accelerator pedal and the brake pedal are both operated, and when the stall state is detected, to set the switching frequency of the power semiconductor device to a value lower than when the stall state is not detected.

Alternatively, in short, the present invention is directed to a method of controlling an electrically powered vehicle including an electric motor and an electric power converter controlling driving of the electric motor by power conversion through on/off control of a power semiconductor device, including first to third steps. At the first step, operations of the accelerator pedal and the brake pedal are detected. At the second step, based on the detection of the first step, a stall state, in which the accelerator pedal and the brake pedal are both operated, is detected. At the third step, when the stall state is detected at the second step, switching frequency of the power semiconductor device is set lower than when the stall state is not detected By the electrically powered vehicle and the control method thereof configured as described above, it becomes possible, when the stall state in which temperature increase of the electric power converter (represented by an inverter) controlling driving of the electric motor is highly likely, to decrease switching frequency of the power semiconductor device (switching element) forming the electric power converter to be relatively lower than in a normal state (when the stall state is not detected). Therefore, it becomes possible to prevent temperature increase of the switching element at the stall state. Therefore, as compared with the approach in which the measures to prevent overheating are taken after actual temperature increase of the switching element, the effect of protecting the switching element can be improved.

Preferably, in the electrically powered vehicle, the controller further includes a second frequency setting portion. The second frequency setting portion is configured to set, when state of detection by the detecting portion makes a transition from the stall-detected state to the stall-undetected state, the switching frequency of the power semiconductor device higher than when the stall state is detected. Alternatively, the controller further sets, when there is a state transition from the stall-detected state to the stall-undetected state, the switching frequency of the power semiconductor device higher than when the stall state is detected.

Preferably, the method of controlling an electrically powered vehicle further includes the fourth step. At the fourth step, when there is a state transition from the stall-detected state to the stall-undetected state at the second step, switching frequency of the power semiconductor device is set higher than when the stall state is detected.

By this configuration, when the stall state is released, it becomes possible to increase the switching frequency of the electric power converter to be relatively higher than in the stall state, to enable switching control of the electric power converter suitable for normal running.

Preferably, in the electrically powered vehicle, the controller further includes first and second setting portions. The first setting portion is configured to set a carrier frequency used for on/off control in accordance with the state of operation of the electric motor. The second setting portion is configured to set the carrier frequency to a value relatively lower than the first setting portion when the state of operation is the stall state. Further, the first and second frequency setting portions are configured such that while the detecting portion detects the stall state, the second setting portion is selected to set the carrier frequency and while the detecting portion does not detect the stall state, the first setting portion is selected to set the carrier frequency.

Preferably, in the method of controlling the electrically powered vehicle, at the third and fourth step, when the stall state is not detected at the second step, the carrier frequency is set based on a first setting map formed to set the carrier frequency used for on/off control in accordance with the state of operation of the electric motor, and on the other hand, when the stall state is detected at the second step, the carrier frequency is set based on a second setting map formed to set the carrier frequency to a value relatively lower than the first setting map.

By this configuration, by a simple control structure in which pre-set first and second setting portions (such as frequency setting maps) are selectively used dependent on whether the stall state is detected or not, it becomes possible to appropriately set the switching frequency of the power semiconductor device (switching element) of the electric power converter.

Preferably, in the electrically powered vehicle, the first frequency setting portion is configured to set, when the detecting portion detects the stall state, the carrier frequency used for on/off control to a value lower than when the stall state is not detected.

Preferably, in the method of controlling the electrically powered vehicle, when the stall state is detected at the second step, the carrier frequency used for on/off control is set to a value lower than when the stall state is not detected.

By the above-described configuration, by setting the carrier frequency used for on/off control (that is, switching control) of the power semiconductor device of the electric power converter (represented by an inverter), the switching frequency of the electric power converter can be lowered at the stall state.

Preferably, the electrically powered vehicle is a hybrid vehicle additionally including an internal combustion engine.

Thus, in a hybrid vehicle including an electric motor for wheel driving and an internal combustion engine, it become possible to appropriately avoid temperature increase of the power semiconductor device (switching element) forming the electric power converter controlling driving of the electric motor.

Therefore, main advantage of the present invention is that temperature increase of the power semiconductor device (switching element) forming the electric power converter controlling driving of the electric motor mounted on the electrically powered vehicle can appropriately be avoided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
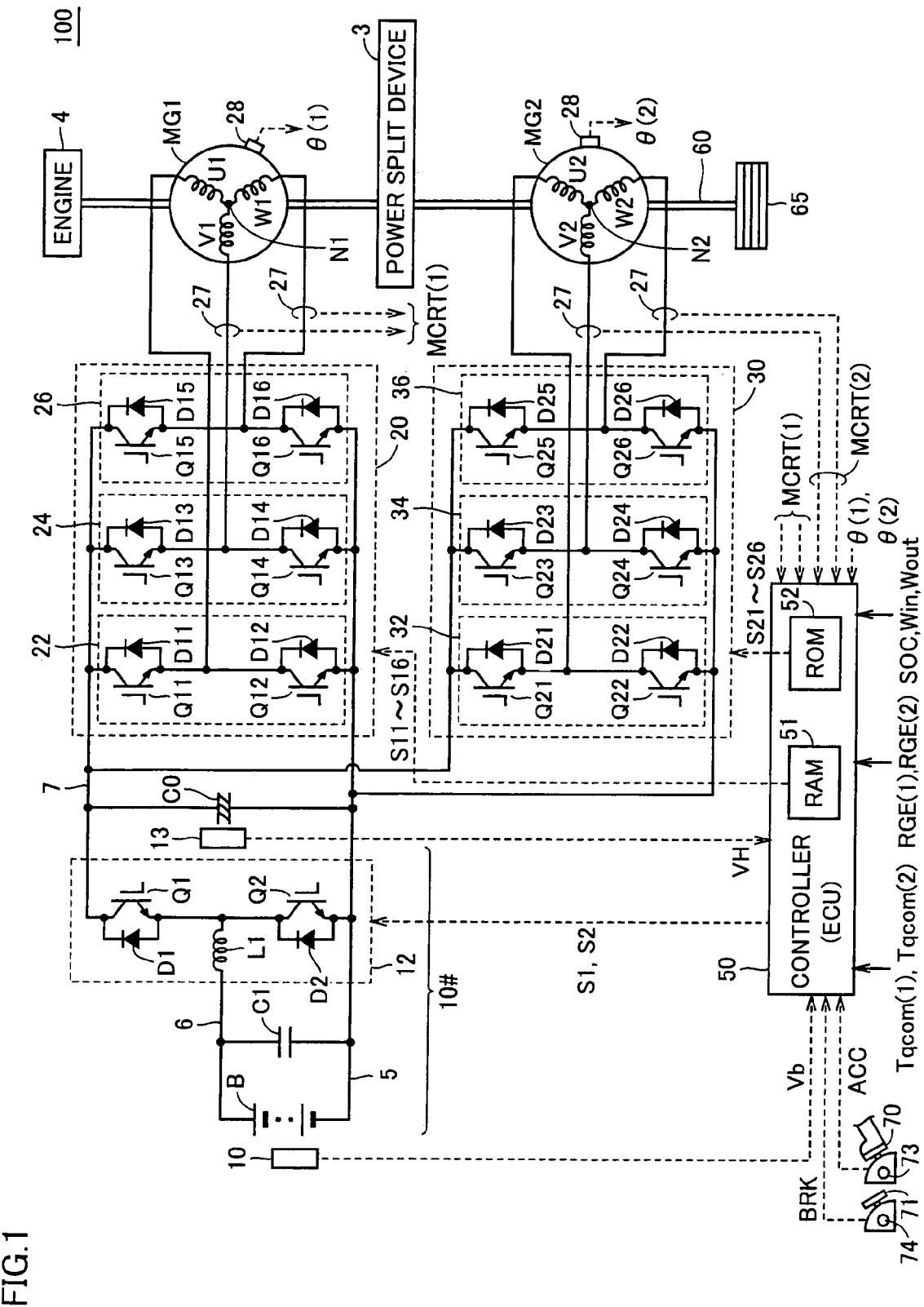
FIG. 1 is a block diagram showing a configuration of a hybrid vehicle as an example of an electrically powered vehicle, to be controlled by the controller of an electrically powered vehicle in accordance with an embodiment of the present invention.

In the following, embodiments of the present invention will be described in detail with reference to the figures. Throughout the figures, the same or corresponding portions are denoted by the same reference characters and, basically, description thereof will not be repeated.

FIG. 1 is a block diagram showing a configuration of a hybrid vehicle 100 as an example of an electrically powered vehicle in accordance with an embodiment of the present invention.

Referring to FIG. 1, hybrid vehicle 100 includes a power distribution mechanism 3, an engine 4, motor generators MG1 and MG2 as representative examples of electric motor, a driving shaft 62 and a wheel (driving wheel) 65. Hybrid vehicle 100 further includes a DC voltage generating unit 10#, a smoothing capacitor C0, inverters 20 and 30, and a controller 50.

Power split device 3 is coupled to engine 4 and to motor generators MG1 and MG2, and distributes power among these. By way of example, a planetary gear mechanism having three rotation shafts of a sun gear, a planetary carrier and a ring gear may be used as the power split device 3. These three shafts of rotation are respectively connected to respective rotation shafts of engine 4 and motor generators MG1 and MG2. For instance, it is possible to mechanically connect engine 4 and motor generators MG1 and MG2 to power split device 3 by making the rotor of motor generator MG1 hollow and passing a crank shaft of engine 4 through the center thereof. Specifically, the rotor of motor generator MG1 is connected to the sun gear, an output shaft of engine 4 is connected to the planetary carrier and driving shaft 62 is connected to the ring gear.

Rotation shaft of motor generator MG2 is coupled to driving shaft 62 by a reduction gear or a running gear, not shown. Further, a reduction gear for the rotation shaft of motor generator MG2 may further be incorporated inside the power distributing mechanism 3.

Motor generator MG1 is formed to have functions of a motor and a generator, to operate as a generator driven by engine 4 and as a motor that can start the operation of engine 4.

Similarly, motor generator MG2 is incorporated in the hybrid vehicle 100 as an electric motor driving the wheel (driving wheel) 65. Further, motor generator MG2 is formed to have the functions of a motor and a generator, to generate an output torque in the direction opposite to the rotation of wheel 65, thereby to regenerate electric power.

DC voltage generating unit 10# includes a DC power source B, a smoothing capacitor C1 and a voltage step-up/down converter 12.

Nickel hydride or lithium ion secondary battery or an electric storage such as an electric double layer capacitor may be used as DC power source B. A DC voltage Vb output from DC power source B is detected by a voltage sensor 10. Voltage sensor 10 outputs the detected DC voltage Vb to controller 50.

Between a positive electrode terminal of DC power source B and a power supply line 6 and between a negative electrode terminal of DC power source B and a ground line 5, relays (not shown) are provided, which are turned on when the vehicle is in operation and turned off when the operation of the vehicle stops.

Step-up/down converter 12 includes a reactor L1 and power semiconductor switching elements Q1 and Q2. Reactor L1 is connected between a connection node of switching elements Q1 and Q2 and power supply line 6. Smoothing capacitor C0 is connected between power supply line 7 and ground line 5.

Power semiconductor switching elements Q1 and Q2 are connected in series between power supply line 7 and ground line 5. On/off of power semiconductor switching elements Q1 and Q2 is controlled by switching control signals S1 and S2 from controller 50.

In the embodiment of the present invention, as the power semiconductor switching element (hereinafter simply referred to as a "switching element"), an IGBT (Insulated Gate Bipolar Transistor), a power MOS (Metal Oxide Semiconductor) transistor, or a power bipolar transistor may be used. Anti-parallel diodes D1 and D2 are arranged for switching elements Q1 and Q2.

Inverter 20 is formed of a U-phase arm 22, a V-phase arm 24 and a W-phase arm 26 provided in parallel between power supply line 7 and ground line 5. The arm of each phase is implemented by switching elements connected in series between power supply line 7 and ground line 5. For example, U-phase arm 22 includes switching elements Q11 and Q12, V-phase arm 24 includes switching elements Q13 and Q14, and W-phase arm 26 includes switching elements Q11 and Q16. Further, anti-parallel diodes D11 to D16 are connected to switching elements Q11 to Q16, respectively. On/off of switching elements Q11 to Q16 is controlled by switching control signals S11 to S16 from controller 50, respectively.

Motor generator MG1 includes a U-phase coil U1, a V-phase coil V1 and a W-phase coil W1, provided on a stator, and a rotor, not shown. U-phase coil U1, V-phase coil V1 and W-phase coil W1 have one end connected together at a neutral point N1, and have the other end connected to U-phase arm 22, V-phase arm 24 and W-phase arm 26 of inverter 20, respectively. Inverter 20 performs bi-directional power conversion between DC voltage generating unit 10# and motor generator MG1, through on/off control (switching control) of switching elements Q11 to Q16 in response to switching control signals S11 to S16 from controller 50.

Specifically, in accordance with switching control by controller 50, inverter 20 may convert the DC voltage received from power supply line 7 to a 3-phase AC voltage, and output the converted 3-phase AC voltage to motor generator MG1. Consequently, motor generator MG1 is driven to generate a designated torque. Further, in accordance with the switching control by controller 50, inverter 20 may convert the 3-phase AC voltage generated by motor generator MG1 receiving an output of engine 4 to a DC voltage and output the converted DC voltage to power supply line 7.

Inverter 30 has a structure similar to inverter 20, and includes switching elements Q21 to Q26, of which on/off is controlled by switching control signals S21 to S26, and anti-parallel diodes D21 to D26.

Motor generator MG2 has a structure similar to motor generator MG1, and includes a U-phase coil U2, a V-phase coil V2 and a W-phase coil W2 provided on a stator, and a rotor, not shown. Similar to motor generator MG1, U-phase coil U2, V-phase coil V2 and W-phase coil W2 have one end connected together at a neutral point N2, and have the other end connected to U-phase arm 32, V-phase arm 34 and W-phase arm 36 of inverter 30, respectively.

Inverter 30 performs bi-directional power conversion between DC voltage generating unit 10# and motor generator MG2, through on/off control (switching control) of switching elements Q21 to Q26 in response to switching control signals S21 to S26 from controller 50.

Specifically, in accordance with switching control by controller 50, inverter 30 may convert the DC voltage received from power supply line 7 to a 3-phase AC voltage, and output the converted 3-phase AC voltage to motor generator MG2. Consequently, motor generator MG2 is driven to generate a designated torque. Further, in accordance with the switching control by controller 50, inverter 30 may convert the 3-phase AC voltage generated by motor generator MG2 receiving rotational force of wheel 65 at the time of regenerative braking of the vehicle to a DC voltage and output the converted DC voltage to power supply line 7.

The regenerative braking here refers to braking with regeneration through a foot brake operation by a driver of the hybrid vehicle, or deceleration (or stopping acceleration) of the vehicle while regenerating power, by releasing the accelerator pedal during running, without operating the foot brake.

Each of motor generators MG1 and MG2 is provided with a current sensor 27 and a rotation angle sensor (resolver) 28. As the sum of instantaneous values of 3-phase currents iu, iv and iw is zero, what is necessary is simply to arrange the current sensors 27 to detect motor currents of two phases only (for example, V-phase current iv and W-phase current iw), as shown in FIG. 1. Rotation angle sensor 28 detects a rotation angle θ of the rotor, not shown, of motor generators MG1 and MG2, and transmits the detected rotation angle θ to controller 50. Based on the rotation angle θ, the number of rotations Nmt (angular velocity ω) of motor generators MG1 and MG2 may be calculated by controller 50.

Motor current MCRT(1) and rotor rotation angle θ(1) of motor generator MG1 as well as motor current MCRT(2) and rotor rotation angle θ(2) of motor generator MG2 detected by these sensors are input to controller 50. Further, controller 50 receives, as inputs, a torque command value Tqcom(1) and a control signal RGE(1) representing a regenerative operation of motor generator MG1 as well as a torque command value Tqcom(2) and a control signal RGE(2) representing a regenerative operation of motor generator MG2, as motor commands.

Controller 50 implemented by an electronic control unit (ECU) includes a microcomputer (not shown), an RAM (Random Access Memory) 51 and an ROM (Read Only Memory) 52, and generates, in accordance with a prescribed program processing, switching control signals S1 and S2 (step-up/down converter 12), S11 to S16 (inverter 20) and S21 to S26 (inverter 30) for switching control of step-up/down converter 12 and inverters 20 and 30, such that motor generators MG1 and MG2 operate in accordance with a motor command input from the electronic control unit (ECU) of a higher order.

Further, information related to DC power source B such as SOC (state of charge) and allowable power amounts Win and Wout representing charge/discharge limitation is input to controller 50. Specifically, controller 50 has a function of limiting, as needed, the power consumption and the power generation of motor generators MG1 and MG2, so that excessive charge or excessive discharge of DC power source B can be avoided.

As is well known, acceleration and deceleration/stopping commands of hybrid vehicle from the driver are input by operations of an accelerator pedal 70 and a brake pedal 71. The operations of accelerator pedal 70 and brake pedal 71 (amount of pressing) by the driver are detected by an accelerator pedal position sensor 73 and a brake pedal position sensor 74. Accelerator pedal position sensor 73 and brake pedal position sensor 74 respectively output voltages that correspond to the amount of pressing of accelerator pedal 70 and brake pedal 71.

Output signals ACC and BRK indicating the amount of pressing of accelerator pedal position sensor 73 and brake pedal position sensor 74 are input to controller 50. As will be understood from the following description, in the present embodiment, overheat protection control of switching element by controller 50 is executed when the driver presses both accelerator pedal 70 and brake pedal 71. Therefore, the signals ACC and BRK input to controller 50 may be signals representing the amounts of pressing of accelerator pedal 70 and brake pedal 71 or the signals may be flag signals representing whether the driver pressed the pedal or not (amount of pressing #0 or not). Accelerator pedal position sensor 73 corresponds to the "first detector" of the present invention, and brake pedal position sensor 74 corresponds to the "second detector" of the present invention.

Next, operations of step-up/down converter 12 and inverters 20 and 30 for controlling driving of motor generators MG1 and MG2 will be described.

In a voltage step-up (boosting) operation of step-up/down converter 12, controller 50 calculates a command value of a DC voltage VH based on the state of operations of motor generators MG1 and MG2, and based on the command value and the detected value of system voltage VH detected by a voltage sensor 13, generates switching control signals S1 and S2 such that the output voltage VH attains to the voltage command value.

At the time of voltage boosting operation, step-up/down converter 12 commonly supplies the DC voltage VH (the DC voltage corresponding to the input voltage to inverters 20 and 30 will be also referred to as the "system voltage VH") obtained by boosting the DC voltage Vb supplied from DC power source B, to inverters 20 and 30. More specifically, in response to switching control signals S1 and S2 from controller 50, duty ratio (ratio of on period) of switching elements Q1 and Q2 is set, and the boosting ratio corresponds to the duty ratio.

At the time of a voltage step-down operation, step-up/down converter 12 charges DC power source B by lowering the DC voltage (system voltage) supplied from inverters 20 and 30 through smoothing capacitor C0. More specifically, in response to switching control signals S1 and S2 from controller 50, a period in which only switching element Q1 is on and a period in which both switching elements Q1 and Q2 are off are provided alternately, and the ratio of voltage lowering corresponds to the duty ratio of the on period.

Smoothing capacitor C0 smoothes the DC voltage from step-up/down converter 12, and supplies the smoothed DC voltage to inverters 20 and 30. Voltage sensor 13 detects the voltage at opposite ends of smoothing capacitor C0, that is, the system voltage, and outputs the detected value VH to controller 50.

When the torque command value of corresponding motor generator MG2 is positive (Tqcom(2)>0), inverter 30 drives motor generator MG2 such that the DC voltage supplied from smoothing capacitor C0 is converted to an AC voltage and a positive torque is output, through on/off operation (switching operation) of switching elements Q21 to Q26 in response to switching control signals S21 to S26 from controller 50. Further, when torque command value of motor generator MG2 is zero (Tqcom(2)=0), inverter 30 drives motor generator MG2 such that the DC voltage is converted to an AC voltage and the torque attains to zero, through the switching operation in response to switching control signals S21 to S26. In this manner, motor generator MG2 is driven to generate the zero or positive torque as designated by torque command value Tqcom.

Further, at the time of regenerative operation of the hybrid vehicle, the torque command value of motor generator MG2 is set to a negative value (Tqcom(2)<0). Here, inverter 30 converts the AC voltage generated by motor generator MG2 to a DC voltage, by the switching operation in response to switching control signals S21 to S26, and supplies the converted DC voltage (system voltage) to step-up/down converter 12 through smoothing capacitor C0.

In this manner, inverter 30 performs power conversion such that motor generator MG2 operates in accordance with the command value, by on/off control of switching elements Q21 to Q26 in response to switching control signals S21 to S26 from controller 50. Further, similar to the operation of inverter 30, inverter 20 performs power conversion such that motor generator MG1 operates in accordance with the command value, by on/off control of switching elements Q11 to Q 16 in response to switching control signals S11 to S16 from controller 50.

As described above, controller 50 controls driving of motor generators MG1 and MG2 in accordance with torque command values Tqcom(1) and Tqcom(2), whereby in hybrid vehicle 100, generation of vehicle driving power through power consumption by motor generator MG2, generation of power for charging DC power source B or power to be consumed by motor generator MG2 through power generation by motor generator MG1, and generation of power for charging DC power source B through regenerative braking operation (power generation) by motor generator MG2 may appropriately be executed, in accordance with the state of operation of the vehicle.

Driving control of motor generators MG1 and MG2 by controller 50 is performed basically through feedback control of a motor current MCRT, which will be described in the following.

Figure 2:
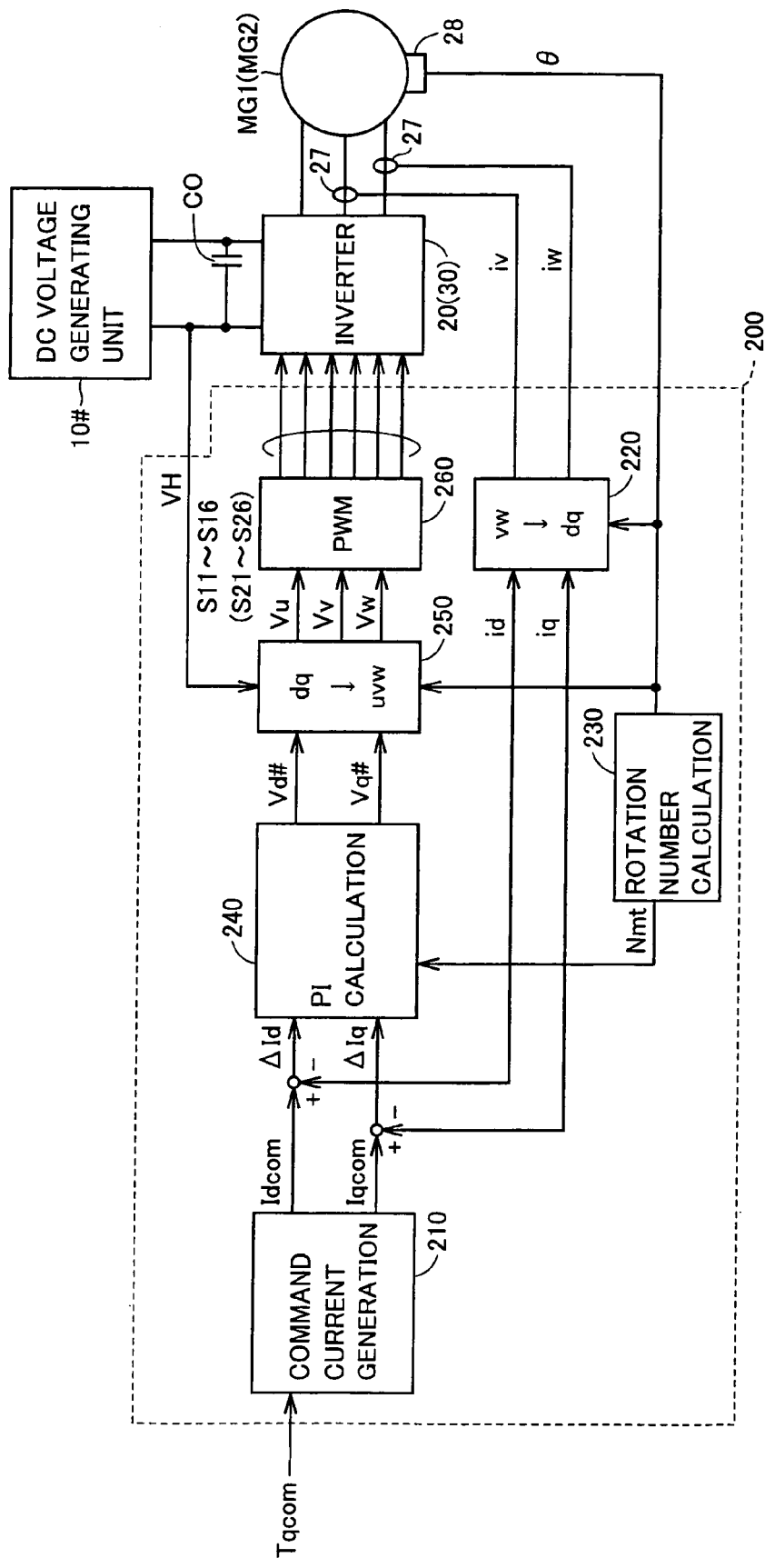
FIG. 2. is a control block diagram representing a motor control structure in the hybrid vehicle shown in FIG. 1.

FIG. 2. is a control block diagram representing a motor control structure in the hybrid vehicle 100 shown in FIG. 1.

Referring to FIG. 2, a current control block 200 includes a command current generating portion 210, coordinate converting portions 220 and 250, a rotation number calculating portion 230, a PI calculating portion 240, and a PWM signal generating portion 260. Here, current control block 200 represents a functional block of controller 50 realized by executing, at a prescribed period, a program stored beforehand in controller 50. Current control block 200 is provided for each of motor generators MG1 and MG2.

Command current generating portion 210 generates command currents Idcom and Iqcom in accordance with torque command value Tqcom(1) (Tqcom(2)) of motor generator MG1 (MG2) in accordance with a table or the like prepared in advance.

By coordinate conversion (3-phase→2-phase) using the angle of rotation θ of motor generator MG1 (MG2) detected by rotation angle sensor 28 provided on motor generator MG1 (MG2), based on the motor current MCRT (iv, iw, iu=−(iv+iw)) detected by current sensor 27, coordinate converting portion 220 calculates a d-axis current id and q-axis current iq. Rotation number calculating portion 230 calculates the number of rotations Nmt of motor generator MG1 (MG2) based on the output of rotation angle sensor 28.

To PI calculating portion 240, deviation ΔId (ΔId=Idcom−id) from the command value of d-axis current and deviation ΔIq (ΔIq=Iqcom−iq) from the command value of q-axis current are input. PI calculating portion 240 calculates control deviation by PI operation with a prescribed gain for each of d-axis current deviation ΔId and q-axis current deviation ΔIq, and generates a d-axis command voltage value Vd# and a q-axis command voltage value Vq#, in accordance with the control deviation.

Coordinate converting portion 250 converts the d-axis command voltage value Vd# and the q-axis command voltage value Vq# to command voltage values Vu, Vv and Vw of respective phases U, V and W, through coordinate conversion (2-phase→3-phase), using the angle of rotation θ of motor generator MG1 (MG2). The DC voltage VH is also reflected on the conversion from the d-axis command voltage value Vd# and the q-axis command voltage value Vq# to command voltage values Vu, Vv and Vw of respective phases.

PWM signal generating portion 260 generates, based on a comparison between the command voltage values Vu, Vv and Vw of respective phases and a prescribed carrier wave, the switching control signals S11 to S16 (S21 to S26) of inverter 20 (30) shown in FIG. 1.

Switching of inverter 20 (30) is controlled in accordance with switching control signals S11 to S16 (S21 to S26) generated by current control block 200, and as a result, an AC voltage to output the torque in accordance with the torque command value Tqom(1) (Tqcom(2)) is applied to motor generator MG1 (MG2).

Figure 3:
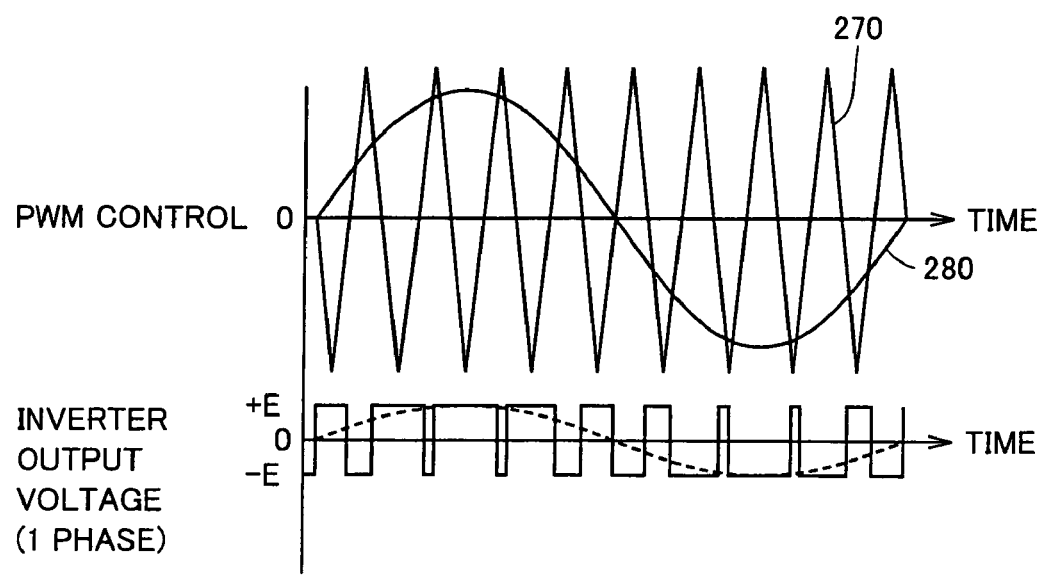
FIG. 3 is a diagram of waveforms illustrating pulse width modulation (PWM) control at a PWM signal generating portion shown in FIG. 2.

FIG. 3 is a diagram of waveforms illustrating pulse width modulation (PWM) control at PWM signal generating portion 260.

PWM control refers to a method of control in which an average value of output voltages at every period is varied by varying pulse width of rectangular output voltage at an every prescribed period. Generally, the prescribed period is divided into a plurality of switching periods corresponding to the period of the carrier wave, and at every switching period, the power semiconductor switching element has its on/off controlled, so that the pulse width modulation control described above is realized.

Referring to FIG. 3, in PWM signal generating portion 260, a signal wave 280 in accordance with command voltage values Vu, Vv and Vw of respective phases from coordinate converting portion 250 is compared with a carrier wave 270 of a prescribed frequency. On/off of the switching element at the arm of each phase of inverter 20 (30) is switched between a section where the carrier wave voltage is higher than the signal wave voltage and a section where the signal wave voltage is higher than the carrier wave voltage, whereby as the inverter output voltage of each phase, an AC voltage as a set of rectangular waves can be supplied to motor generator MG1 (MG2). Fundamental wave component of the AC voltage is plotted by a dotted line in FIG. 3. Specifically, the frequency of carrier wave 270 (carrier frequency) corresponds to the switching frequency of each of the switching elements forming inverter 20 (30).

In the present embodiment, the frequency of carrier wave 270 used for PWM control at each inverter 20 (30) is set differently depending on situation, from the viewpoint of protecting switching elements.

Figure 4:
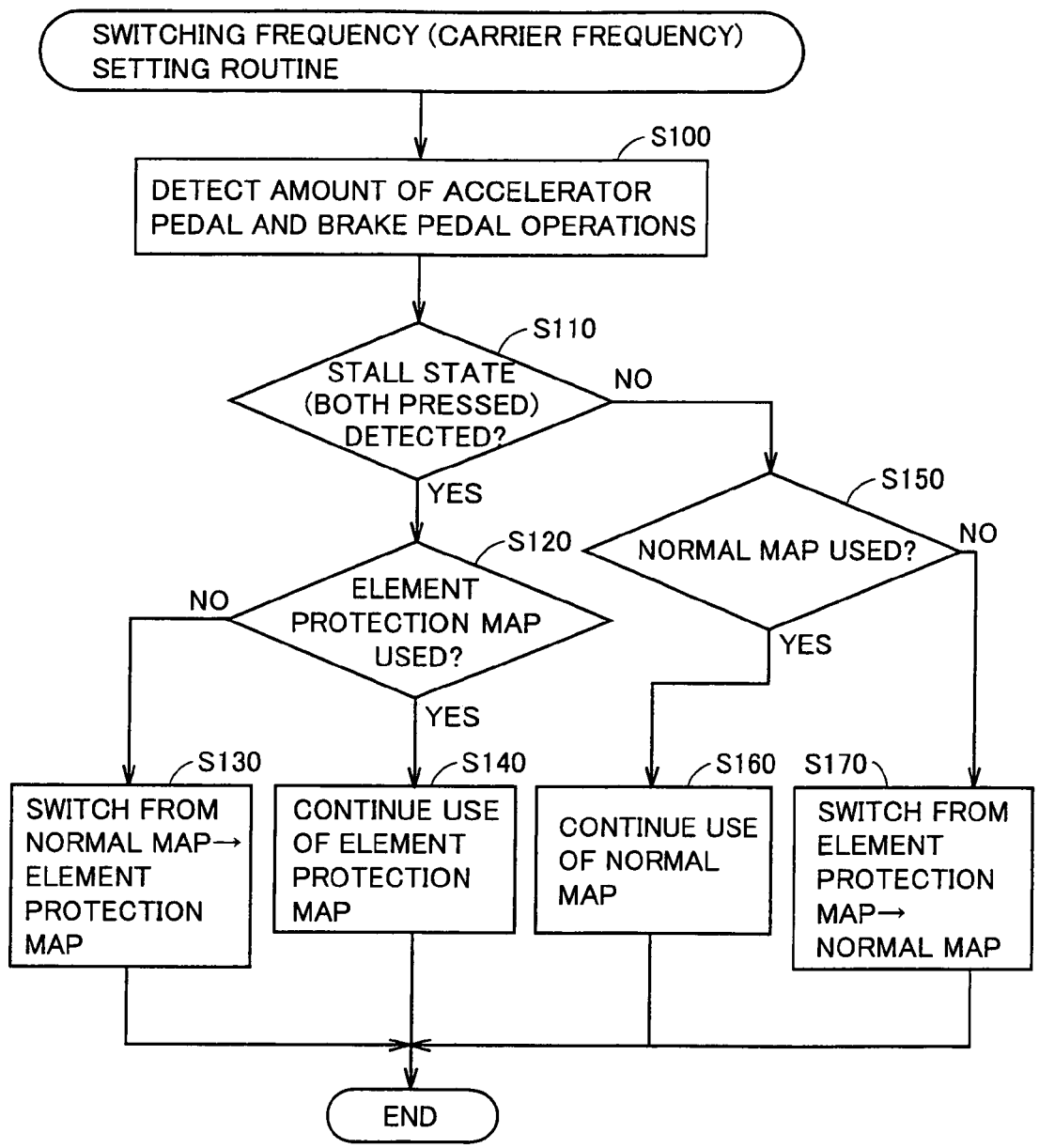
FIG. 4 is a flowchart representing a subroutine executing a switching frequency setting control by a controller for protecting a switching element of an inverter.

FIG. 4 is a flowchart representing switching frequency setting control by controller 50 for protecting switching elements of the inverter.

Referring to FIG. 4, at step S100, controller 50 detects an operation of the accelerator pedal and an operation of the brake pedal by the driver, based on signals ACC and BRK shown in FIG. 1. At step S110, controller 50 detects whether it is a state in which both accelerator pedal 70 and brake pedal 71 are pressed (hereinafter also referred to as a stall state) or not.

Specifically, at step S110, the stall state is detected when the amount of pressing of accelerator pedal 70 and the amount of pressing of brake pedal 71 are both not 0, based on the signals ACC and BRK. It is expected, for example, when hybrid vehicle 100 is stopped to be ready for hill-starting, that the stall state as such is entered by the operation of the driver. Different from the normal driving, in the stall state, a characteristic motor command is generated, which continuously requires a torque output of some extent, to motor generator MG2 in the stopped state or in a very slow state.

Here, in the normal operation, the carrier frequency (that is, switching frequency of the inverter) is set to a relatively high frequency so that electromagnetic resonance sound accompanying the switching operation of the inverter attains to a frequency higher than audio range. Power loss at the switching element, however, increases in accordance with the switching frequency, and therefore, in the stall state in which the motor command as mentioned above is generated, when the inverter is operated at the switching frequency for the normal operation, excessive heat would be built-up as the power loss increases in the switching element, possibly causing overheat damage.

Specifically, when the stall state is entered and the inverter control at the switching frequency for normal operation is continued, it is highly likely that the temperature of the switching element increases, even if the temperature of the switching element is not yet high.

Figure 5:
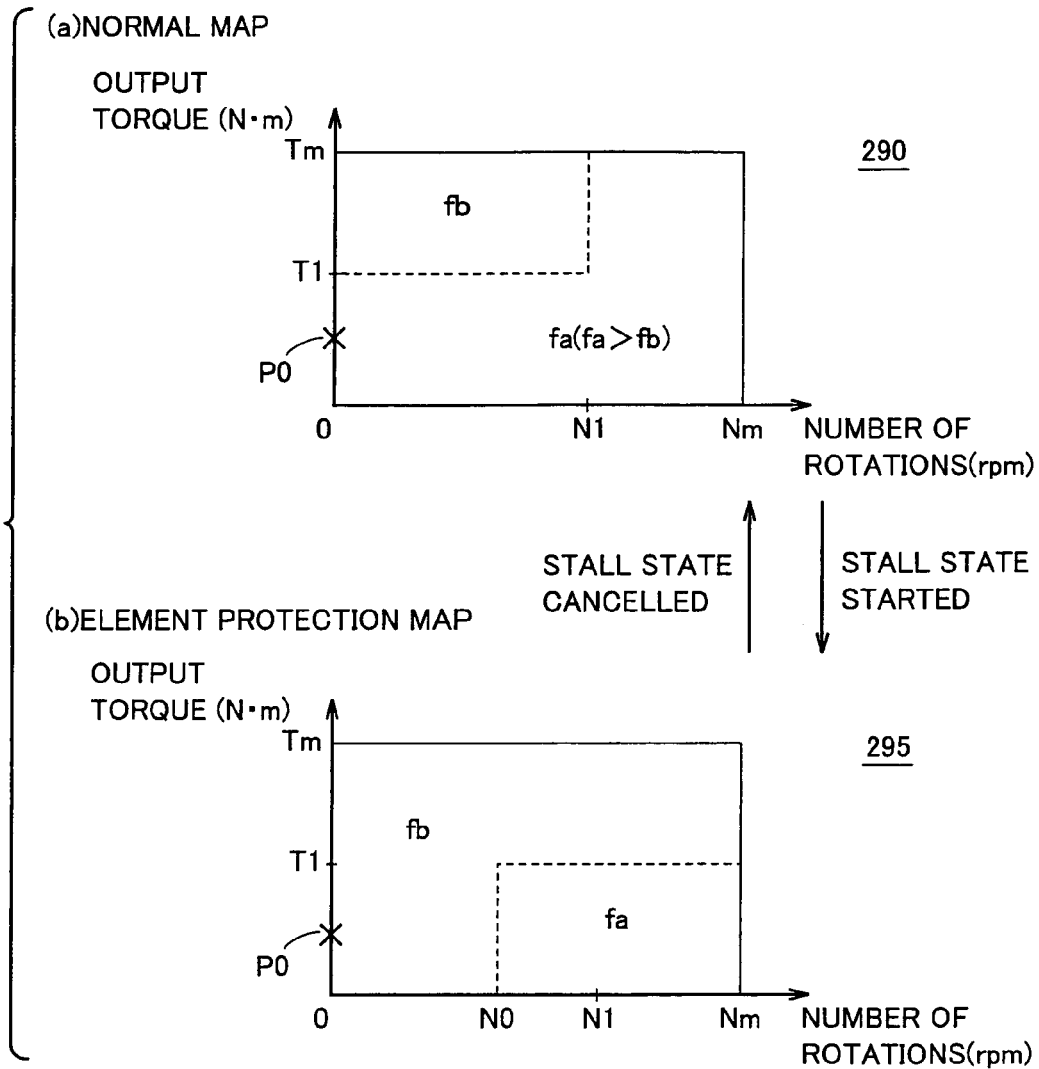
FIG. 5 is an illustration showing switching between carrier frequency setting maps for switching control of the inverter.

Therefore, in the embodiment of the present invention, a carrier frequency setting map for normal control and a carrier frequency setting map for overheat protection used when element protection is considered necessary, are switched for use, dependent on whether the stall state is detected or not, as shown in FIG. 5.

FIG. 5(a) schematically shows the carrier frequency setting map (normal map) 290 for normal control used for normal operation, and FIG. 5(b) schematically shows the carrier frequency setting map (element protection map) 295 for overheat protection. Normal map 290 and element protection map 295 are stored in an ROM 52 of controller 50.

Referring to FIG. 5(a), in normal map 290, the carrier frequency is determined in accordance with the state of operation (number of rotations and output torque) of the motor generator. In normal map 290, except for the time of low speed and high output where rotation number N<N1 and output torque command value>T1, the carrier frequency is set to normal frequency fa. At the time of low speed and high output, the carrier frequency is set to a protection frequency fb. Normal frequency fa is set to about 5 to about 10 kHz, considering that the electromagnetic resonance becomes higher than the audio range and excessive switching loss can be avoided. In contrast, protection frequency fb is set to a value (for example, about 1.25 kHz) lower than the normal frequency fa, in order to suppress power loss as a cause of heat build-up at the switching element.

When the protection frequency fb is used, though there is a concern of noise generation as the switching operation takes place in the audio frequency range, it is possible to suppress power loss as the number of switching of switching element decreases. As a result, temperature increase of the switching element can be suppressed and the element can be protected.

On the other hand, in element protection map 295, in the range where rotation number<N0 (N0<N1), the carrier frequency is always set to protection frequency fb, regardless of the output torque. Further, at the time of high output torque (output torque value>T1), the carrier frequency is set to protection frequency fb. In other ranges, the carrier frequency is set to the normal frequency fa.

The stall state described above is expected to occur in the range where the speed of rotation is low, for example, when the vehicle is stopped to be ready for hill-starting. Typically, such a state corresponds to the operation point P0 shown in (a) and (b) of FIG. 5 or around this point, at which the vehicle as well as the motor generator are stopped or operating at a very low speed, while the output torque command value has attained to a certain value because of an operation of the accelerator pedal. Therefore, in accordance with element protection map 295, the carrier frequency can be set to protection frequency fb in the stall state.

Again referring to FIG. 4, when the stall state is detected at step S110, controller 50 determines at step S120 whether element protection map 295 is being used at present or not. When normal map 290 is being used (NO at step S120), controller 50 switches at step S130 the carrier frequency setting map from normal map 290 to element protection map 295, and sets the carrier frequency for controlling the inverter using element protection map 295. The process of step S130 is executed when the driver newly operates the pedal or pedals to cause the stall state, from the last execution of the program to the present time.

When it is YES at step S120, that is, when element protection map 295 has already been used, controller 50 sets, at step S140, the carrier frequency for controlling the inverter, continuously using element protection map 295. The process of step S140 is executed when the stall state, once entered by the driver operation, has been maintained.

On the contrary, when it is NO at step S110, that is, when the stall state is not detected, controller 50 determines, at step S150, whether normal map 290 is being used at present or not. When normal map 290 is being used at present (YES at S150), controller 50 sets, at step S160, the carrier frequency for controlling the inverter, continuously using normal map 290. The process of step S160 is executed when the non-stall state is maintained.

When it is NO at step S150, that is, when element protection map 295 is being used at present, controller 50 switches, at step S170, the carrier frequency setting map from element protection map 295 to normal map 290, and sets the carrier frequency for controlling the inverter using normal map 290. The process of step S170 is executed when the driver newly operates the pedal or pedals to cancel the stall state, from the last execution of the program to the present time.

By executing the switching frequency setting control in accordance with the subroutine shown in FIG. 4, the carrier frequency for inverter control (that is, switching frequency) is set in accordance with the state of operation (number of rotations and output torque) of the motor generator, using normal map 290 in the normal operation (non-stall state) and using element protection map 295 in the stall state. Specifically, one of the normal frequency fa and the protection frequency fb is selected.

A control structure in which the switching frequency is fixedly set to the protection frequency fb when the stall state is detected (YES at step S110), rather than making a reference to element protection map 295, may be adopted, and similar effect of protecting switching element in the stall state can be attained.

Figure 6:
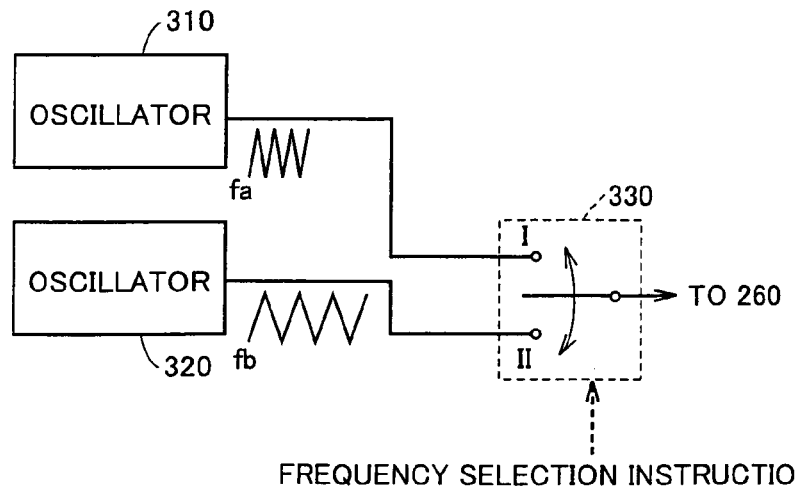
FIG. 6 is a block diagram representing a first example of a carrier frequency switching structure.

FIG. 6 shows an example of a carrier wave generating mechanism for switching the carrier frequency between normal frequency fa and protection frequency fb.

Referring to FIG. 6, a carrier wave generating mechanism 300 includes an oscillator 310 generating the carrier wave of normal frequency fa, an oscillator 320 generating the carrier wave of protection frequency fb (fb<fa), and a change-over switch 330. Change-over switch 330 connects one of the oscillators 310 and 320 to PWM signal generating portion 260, in responses to a frequency selection instruction indicating which of the normal frequency fa and protection frequency fb is to be selected.

When the carrier frequency is set to the normal frequency fa by the carrier frequency setting map, change-over switch 330 is controlled to the I side, and carrier wave 270 of normal frequency fa is transmitted to PWM signal generating portion 260.

On the contrary, when the carrier frequency is set to protection frequency fb by the carrier frequency setting map, change-over switch 330 is controlled to the II side, and carrier wave 270 of low frequency (protection frequency fb) is transmitted to PWM signal generating portion 260.

Figure 7:
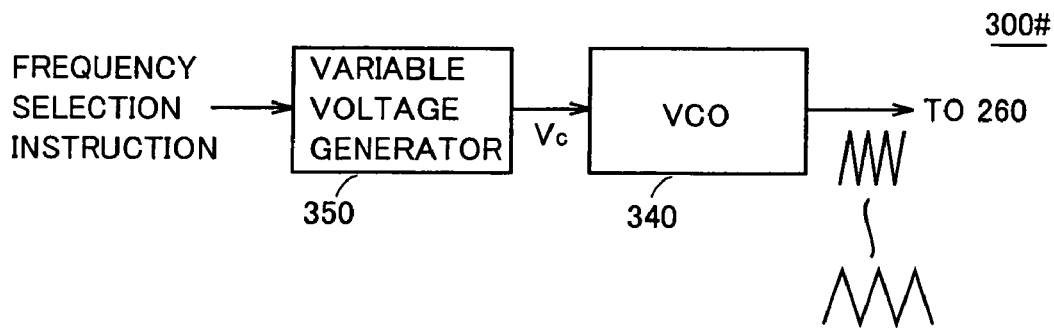
FIG. 7 is a block diagram representing a second example of a carrier frequency switching structure.

Alternatively, a configuration in which the carrier wave frequency is switched by a single oscillator, using a voltage controlled oscillator, may be used, as shown in FIG. 7.

Referring to FIG. 7, a carrier wave generating mechanism 300# includes a voltage controlled oscillator (VCO) 340 and a variable voltage generator 350. VCO 340 generates a carrier wave 270 of the frequency corresponding to an input control voltage Vc, and transmits the same to PWM signal generating portion 260. Variable voltage generator 350 variably sets the control voltage Vc to be input to VCO 340, in response to the frequency selection instruction similar to that of FIG. 6. In this configuration also, it is possible to switch the frequency of carrier wave 270 between normal frequency fa and protection frequency fb, in accordance with the frequency selection instruction.

Though a configuration in which the carrier frequency is switched between two stages, that is, normal frequency fa and protection frequency fb, has been described in the present embodiment, a configuration in which the carrier frequency is switched among larger number of stages may be possible.

Further, though a mechanism of switching the switching frequency for inverter control effected by a single controller (ECU) 50 has been described in the present embodiment, similar control structure may be attained by cooperation of a plurality of controllers (ECUs).

Figure 8:
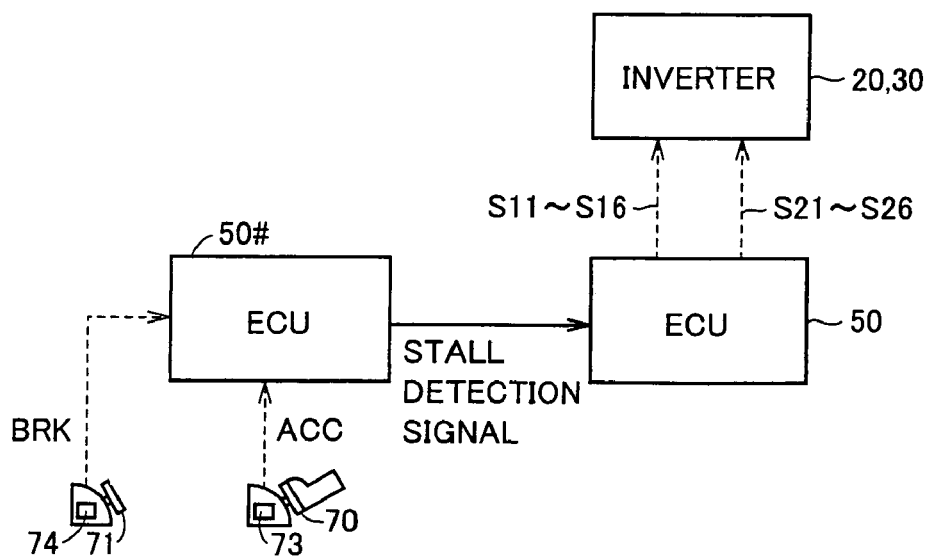
FIG. 8 is a block diagram representing a structure for executing switching frequency setting control in accordance with an embodiment of the present invention, using a plurality of controllers (ECUs).

By way of example, a configuration may be adopted in which, as shown in FIG. 8, the amounts of operation of accelerator pedal 70 and brake pedal 71 are detected and whether it is the stall state or not is detected by another controller (ECU) 50#. Here, a stall detection signal indicating whether it is the stall state or not is input from controller 50# to controller 50 in charge of inverter control.

In the configuration shown in FIG. 8, of the control structure shown in FIG. 4, steps S100 and S110 are executed by controller 50#, and steps S120 to S170 thereafter are executed by controller 50, so that the subroutine shown in FIG. 4 is realized by the cooperation by controllers 50 and 50#. By such a configuration also, the effects similar to the example above can be attained.

As described above, in the hybrid vehicle in accordance with the present embodiment, when the stall state occurs, in which temperature increase of motor generator as the electric motor for generating the wheel driving power is highly likely, the carrier frequency used for inverter control is decreased to be relatively lower than in a normal operation, whereby the switching frequency of the inverter is decreased and temperature increase of the switching element can be suppressed. Therefore, as compared with the approach in which the overheat protecting measures are taken after actual temperature increase of the switching element, the effect of protecting devices attained by overheat prevention of switching elements forming the inverters can be improved.

Further, when the stall state is released, the switching frequency of the inverter is increased relative to that of the stall state, and the switching frequency setting control of the inverter fit for normal running can be realized.

For better understanding, the correspondence between the structure of the embodiment and the present invention will be specified. Step S100 of FIG. 4 corresponds to the "first step" of the present invention, step S110 corresponds to the "detecting means" or the "second step," steps S130 and S140 correspond to the "first frequency setting means" or the "third step", and steps S160 and S170 correspond to the "second frequency setting means" or the "fourth step" of the present invention. Further, the normal map 290 of FIG. 5(a) corresponds to the "first setting means" of the present invention, and the element protection map 295 of FIG. 5(b) corresponds to the "second setting means" of the present invention. Further, steps S130, S140, S160 and S170 of FIG. 4 collectively correspond to the "selecting means" of the present invention.

It is noted that setting control of switching frequency in accordance with the present embodiment may be executed independently for each motor generator. Specifically, an appropriate switching frequency may be set in accordance with the state of operation of each of the plurality of motor generators MG1 and MG2.

When inverter control is done based on different switching frequencies between the plurality of motor generators MG1 and MG2, however, noise possibly generates, because of the difference in switching frequency (difference in carrier frequency). Considering this point, it is possible to use, after the switching frequency setting control described above is done on each of the motor generators MG1 and MG2, the lowest frequency among the set switching frequencies commonly for the inverter control of each of the motor generators MG1 and MG2.

In the embodiment above, a hybrid vehicle of parallel hybrid type, in which both engine 4 and motor generator MG2 are capable of generating the driving force for driving wheels has been described as an example. The present invention, however, is also applicable to protection of switching element in an electric power converter (inverter) for motor control in a hybrid vehicle of series hybrid type, in which the engine operates only as a power supply to the motor and direct driving of wheels is done by the motor. Similarly, in the embodiment above, a hybrid vehicle of mechanical distribution type in which engine 4 and motor generators MG1 and MG2 are connected through a planetary gear mechanism and the energy is distributed by the planetary gear mechanism has been described. The present invention, however, is also applicable to a so-called electric distribution type hybrid vehicle. Further, the present invention is applicable to electrically powered vehicles in general that have an electric motor for generating the driving force for driving wheels, including an electric vehicle not including any engine, for protecting switching element of the electric power converter (inverter) for controlling the electric motor.

Further, when the present invention is applied, the combination and numbers of inverters and motor generators (electric motors) to be used are not limited to those described as an example in the embodiment above. Specifically, in any electrically powered vehicle having an electric motor for generating force for driving wheels of which driving is controlled by an electric power converter through switching control of a power semiconductor device, the present invention may be applied to control switching frequency setting of the electric power converter, without any limitation on the number and types of motor generators (electric motors) and the electric power converters. Particularly, the present invention is applicable for setting switching frequency of an electric power converter that controls switching by a method other than the PWM control method using the carrier wave.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrically powered vehicle, comprising:
an electric motor;
an electric power converter controlling driving of said electric motor by power conversion through on/off control of a power semiconductor device;
a first detector detecting an operation on an accelerator pedal of the vehicle;
a second detector detecting an operation on a brake pedal of the vehicle; and
a controller including detecting means for detecting a stall state in which said accelerator pedal and said brake pedal are both operated, based on outputs from said first and second detectors,
said controller further including
first frequency setting means for setting, when said stall state is detected by said detecting means, switching frequency of said power semiconductor device lower than when said stall state is not detected.

2. The electrically powered vehicle according to claim 1, wherein
said controller further includes
second frequency setting means for setting, when state of detection by said detecting means makes a transition from a stall-detected state to a stall-undetected state, the switching frequency of the power semiconductor device higher than when the stall state is detected.

3. The electrically powered vehicle according to claim 2, wherein said controller further includes first setting means for setting a frequency of a carrier wave used for on/off control in accordance with the state of operation of said electric motor, and second setting means for setting the frequency of said carrier wave to a value relatively lower than the first setting means when the state of operation is said stall state; and said first frequency setting means and said second frequency setting means are configured such that while said detecting means detects said stall state, the second setting means is selected to set the frequency of said carrier wave, and while said detecting means does not detect said stall state, said first setting means is selected to set the frequency of said carrier wave.

4. The electrically powered vehicle according to claim 1, wherein said first frequency setting means sets, when said detecting means detects said stall state, the frequency of carrier wave used for said on/off control to a value lower than when said stall state is not detected.

5. The electrically powered vehicle according to claim 1, which is a hybrid vehicle further comprising an internal combustion engine.

6. An electrically powered vehicle, comprising:

an electric motor;

an electric power converter controlling driving of said electric motor by power conversion through on/off control of a power semiconductor device;

a first detector detecting an operation on an accelerator pedal of the vehicle;

a second detector detecting an operation on a brake pedal of the vehicle; and a controller controlling operations of said electric motor and said electric power converter, wherein said controller detects a stall state in which said accelerator pedal and said brake pedal are both operated, based on outputs from said first and second detectors, and when said stall state is detected, sets switching frequency of said power semiconductor device lower than when said stall state is not detected.

7. The electrically powered vehicle according to claim 6, wherein said controller sets, when state of detection makes a transition from a stall-detected state to a stall-undetected state, the switching frequency of the power semiconductor device higher than when the stall state is detected.

8. A method of controlling an electrically powered vehicle including an electric motor and an electric power converter controlling driving of said electric motor by power conversion through on/off control of a power semiconductor device, comprising:

the first step of detecting operations on an accelerator pedal and a brake pedal of the vehicle;

the second step of detecting, based on detection at said first step, a stall state in which said accelerator pedal and said brake pedal are both operated; and the third step of setting, when said stall state is detected at said second step, switching frequency of said power semiconductor device lower than when said stall state is not detected.

9. The method of controlling the electrically powered vehicle according to claim 8, further comprising the fourth step of setting, when state of detection makes a transition from the stall-detected state to the stall-undetected state at said second step, the switching frequency of the power semiconductor device higher than when the stall state is detected.

10. The method of controlling the electrically powered vehicle according to claim 9, wherein at said third step and said fourth step, when said stall state is not detected at said second step, a frequency of a carrier wave is set based on a first setting map formed to set the frequency of said carrier wave used for said on/off control in accordance with a state of operation of said electric motor, and when said stall state is detected at said second step, the frequency of said carrier wave is set based on a second setting map formed to set the frequency of said carrier wave to a relatively lower frequency than said first setting map, in a state of operation of said stall state.

11. The method of controlling the electrically powered vehicle according to claim 8, wherein at said third step, when said stall state is detected at said second step, the frequency of the carrier wave used for said on/off control is set lower than when said stall state is not detected.

12. The method of controlling the electrically powered vehicle according to claim 8, wherein said electrically powered vehicle is a hybrid vehicle further including an internal combustion engine.

* * * * *